US011568479B2

(12) United States Patent
MacFarland

(10) Patent No.: US 11,568,479 B2
(45) Date of Patent: Jan. 31, 2023

(54) GENERATING ONLINE AUCTION LISTINGS

(71) Applicant: Webcat, LLC, Henderson, NV (US)

(72) Inventor: Derek MacFarland, Provo, UT (US)

(*) Notice: Subject to any disclaimer, the term of this patent is extended or adjusted under 35 U.S.C. 154(b) by 0 days.

(21) Appl. No.: 16/879,430

(22) Filed: May 20, 2020

(65) Prior Publication Data

US 2020/0372570 A1  Nov. 26, 2020

Related U.S. Application Data

(60) Provisional application No. 62/850,078, filed on May 20, 2019.

(51) Int. Cl.
*G06Q 30/08* (2012.01)
*G06Q 30/06* (2012.01)
*G06Q 20/10* (2012.01)
*G06Q 20/20* (2012.01)

(52) U.S. Cl.
CPC ........... *G06Q 30/08* (2013.01); *G06Q 20/102* (2013.01); *G06Q 20/208* (2013.01); *G06Q 30/0607* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,947,906 B1 * | 9/2005 | Underwood | G06Q 20/10 705/26.3 |
| 7,783,520 B2 * | 8/2010 | Zhang | G06Q 30/0601 705/26.1 |
| 7,895,115 B2 | 2/2011 | Bayyapu et al. | |

(Continued)

FOREIGN PATENT DOCUMENTS

| | | |
|---|---|---|
| WO | 2015044947 A1 | 4/2015 |
| WO | WO-2015044947 A1 * | 4/2015 ......... H04N 5/23222 |

(Continued)

OTHER PUBLICATIONS

PCT/US2020/033825, "Notification of Transmittal of the International Search Report and the Written Opinion of the International Searching Authority, or the Declaration", dated Jul. 28, 2020, pp. 1-13.

(Continued)

*Primary Examiner* — Paul S Schwarzenberg

(74) *Attorney, Agent, or Firm* — Kunzler Bean & Adamson; Robert R. Gempeler

(57) ABSTRACT

Apparatuses, methods, program products, and systems are disclosed for generating online auction listings. An apparatus includes a content processing module that processes, on a mobile device, one or more of image and video content of an item captured with a camera of the mobile device. The one or more of image and video content processed for posting on an online auction marketplace platform. An apparatus includes an information module that receives, on the mobile device, information associated with the item in the one or more of image and video content. An apparatus includes a transmission module that sends the one or more of image and video content and the information associated with the item directly from the mobile device to the online auction marketplace platform to be posted as an auction listing.

20 Claims, 5 Drawing Sheets

(56) References Cited

U.S. PATENT DOCUMENTS

| | | | |
|---|---|---|---|
| 7,991,646 B2 | 8/2011 | Lewis et al. | |
| 8,095,451 B2 * | 1/2012 | Smith | G06Q 30/02 |
| | | | 705/37 |
| 8,321,293 B2 | 11/2012 | Lewis et al. | |
| 8,719,041 B2 | 5/2014 | Veres et al. | |
| 9,043,232 B1 | 5/2015 | Varadarajan | |
| 9,934,522 B2 | 4/2018 | Teo | |
| 2003/0229545 A1 | 12/2003 | Veres et al. | |
| 2006/0004649 A1 * | 1/2006 | Singh | G06Q 30/08 |
| | | | 705/37 |
| 2006/0085300 A1 | 4/2006 | Green | |
| 2007/0100740 A1 | 5/2007 | Penagulur et al. | |
| 2008/0183478 A1 | 7/2008 | Lynch | |
| 2009/0259564 A1 * | 10/2009 | Barkerding | G06Q 20/24 |
| | | | 705/26.1 |
| 2010/0131388 A1 | 5/2010 | Law et al. | |
| 2011/0231260 A1 | 9/2011 | Price | |
| 2012/0123892 A1 | 5/2012 | Ananta et al. | |
| 2014/0032354 A1 * | 1/2014 | Schwab | H04N 1/2179 |
| | | | 705/26.3 |
| 2014/0229312 A1 | 8/2014 | Nuggehalli et al. | |

FOREIGN PATENT DOCUMENTS

| | | | | |
|---|---|---|---|---|
| WO | 2017187328 A1 | 11/2017 | | |
| WO | WO-2017187328 A1 * | 11/2017 | | G06Q 20/407 |

OTHER PUBLICATIONS

EBay News Team, "eBay's App Update Helps Sellers List in Under One Minute", eBay, Apr. 19, 2018, pp. 1-5.

Marsha Collier, "How to Use eBay's Mobile App", Dummies, Business—Online Business—eBay, known about as early and downloaded on Apr. 23, 2019, pp. 1-7.

Ebay, "Selling with the eBay app", ebay Customer Service, known about as early and downloaded on Apr. 23, 2019, pp. 1-3.

* cited by examiner

GENERATING ONLINE AUCTION LISTINGS

CROSS-REFERENCES TO RELATED APPLICATIONS

This application claims the benefit of U.S. Provisional Patent Application No. 62/850,078 entitled "GENERATING ONLINE AUCTION LISTINGS" and filed on May 20, 2019, for Derek MacFarland, which is incorporated herein by reference.

FIELD

This invention relates to online auctions and more particularly relates to generating online auction listings.

BACKGROUND

Online auctions may include auctions that are held over the Internet or another network. Online auctions allow sellers to post products or services for sale and allow buyers to bid on products or services with the winning bidder receiving the product or service. Sometimes it can be cumbersome for sellers to post multimedia and information about a product or service for sale on an auction site especially if the seller has multiple items or services to sell.

SUMMARY

Apparatuses, methods, program products, and systems are disclosed for generating online auction listings. An apparatus for generating online auction listings, in one embodiment, includes a content processing module that processes, on a mobile device, one or more of image and video content of an item captured with a camera of the mobile device. The one or more of image and video content processed for posting on an online auction marketplace platform. An apparatus, in certain embodiments, includes an information module that receives, on the mobile device, information associated with the item in the one or more of image and video content. An apparatus, in various embodiments, includes a transmission module that sends the one or more of image and video content and the information associated with the item directly from the mobile device to the online auction marketplace platform to be posted as an auction listing.

A method for generating online auction listings, in one embodiment, includes processing, on a mobile device, one or more of image and video content of an item captured with a camera of the mobile device. The one or more of image and video content processed for posting on an online auction marketplace platform. In further embodiments, the method includes receiving, on the mobile device, information associated with the item in the one or more of image and video content. In certain embodiments, the method includes sending the one or more of image and video content and the information associated with the item directly from the mobile device to the online auction marketplace platform to be posted as an auction listing.

A system for generating online auction listings, in one embodiment, includes a mobile device comprising a camera and an online auction marketplace platform directly connected to the mobile device over a data network. In further embodiments, the mobile device comprises a processor and memory that stores code executable by the processor to process, on the mobile device, one or more of image and video content of an item captured with the camera of the mobile device such that the one or more of image and video content are processed for posting on the online auction marketplace platform; receive, on the mobile device, information associated with the item in the one or more of image and video content; and send, over the data network, the one or more of image and video content and the information associated with the item directly from the mobile device to the online auction marketplace platform to be posted as an auction listing.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
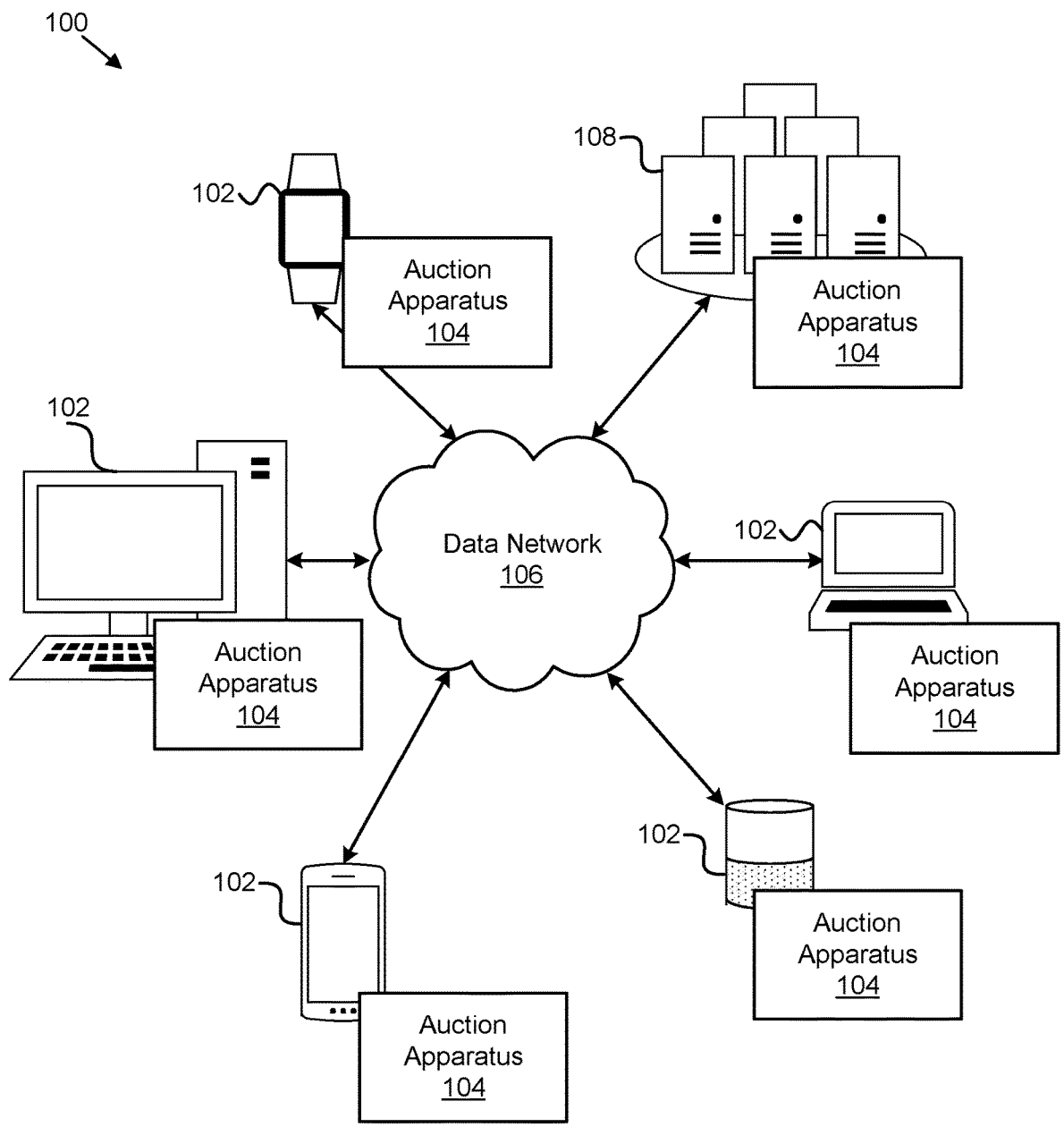
FIG. 1 is a schematic block diagram illustrating one embodiment of a system for generating online auction listings.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

An apparatus for generating online auction listings, in one embodiment, includes a content processing module that processes, on a mobile device, one or more of image and video content of an item captured with a camera of the mobile device. The one or more of image and video content processed for posting on an online auction marketplace platform. An apparatus, in certain embodiments, includes an information module that receives, on the mobile device, information associated with the item in the one or more of image and video content. An apparatus, in various embodiments, includes a transmission module that sends the one or more of image and video content and the information associated with the item directly from the mobile device to the online auction marketplace platform to be posted as an auction listing.

In one embodiment, the apparatus includes a network module that detects that the mobile device is unable to connect to the online auction marketplace platform and one or more of sends the one or more of image and video content and the information associated with the item to a remote third-party storage device for storage, the one or more of image and video content and the information associated with the item sent from the remote third-party storage device to the online auction marketplace platform in response to a connection between the remote third-party storage device and the online auction marketplace platform being established, and stores the one or more of image and video content and the information associated with the item on a secondary storage device of the mobile device.

In one embodiment, the content processing module processes the one or more of image and video content on the mobile device by adjusting one or more characteristics of the one or more of image and video content. The one or more characteristics may include a size, a brightness, a contrast, a resolution, a color, and a filter effect. In certain embodiments, the content processing module processes the one or more of image and video content on the mobile device by adding a watermark to the one or more of image and video content.

In various embodiments, the content processing module sends the one or more of processed image and video content to a third-party hosting website and the information module includes a reference to the one or more of processed image and video content at the third-party hosting website as part of the information associated with the item. In one embodiment, the transmission module sends one or more of image and video content and information associated with the item to the online auction marketplace platform for a plurality of different items in a batch upload.

In one embodiment, the information module receives the information associated with the item by identifying one or more codes within at least one of an image and a video of the item and using the one or more codes to query a database associated with the one or more codes for the information. In certain embodiments, the one or more codes is selected from the group comprising a barcode, a quick response ("QR") code, a universal product code ("UPC"), a European Article Number ("EAN"), a stock keeping unit ("SKU") code, and a vehicle identification number ("VIN") code. In one embodiment, the database is selected from the group comprising a vehicle database and a product database.

In some embodiments, the apparatus includes a sales module that processes payment for the item using the mobile device at a pickup location for the item, wherein one or more characteristics of the sale are adjustable prior to completing the sale. In one embodiment, the sales module collects identifying information of a buyer of the item during pickup of the item. In certain embodiments, the sales module presents one or more documents for a buyer to electronically sign or completing the sale.

In one embodiment, the sales module sets a flag to indicate that the item has been picked-up and the sale is complete. In some embodiments, the online auction marketplace platform comprises a government surplus auction marketplace. In various embodiments, the apparatus includes a compliance module that verifies that the auction listing associated with the one or more of image and video content and the information associated with the item complies with one or more auction rules defined for government surplus auctions. In one embodiment, the auction rules defined for government surplus auctions comprise reallocation rules, buyer qualification rules, and pricing rules.

A method for generating online auction listings, in one embodiment, includes processing, on a mobile device, one or more of image and video content of an item captured with a camera of the mobile device. The one or more of image and video content processed for posting on an online auction marketplace platform. In further embodiments, the method includes receiving, on the mobile device, information associated with the item in the one or more of image and video content. In certain embodiments, the method includes sending the one or more of image and video content and the information associated with the item directly from the mobile device to the online auction marketplace platform to be posted as an auction listing.

In one embodiment, the method includes detecting that the mobile device is unable to connect to the online auction marketplace platform and one or more of sending the one or more of image and video content and the information associated with the item to a remote third-party storage device for storage, the one or more of image and video content and the information associated with the item sent from the remote third-party storage device to the online auction marketplace platform in response to a connection between the remote third-party storage device and the online auction marketplace platform being established, and storing the one or more of image and video content and the information associated with the item on a secondary storage device of the mobile device.

In one embodiment, the method includes sending one or more of image and video content and information associated with the item to the online auction marketplace platform for a plurality of different items in a batch upload.

A system for generating online auction listings, in one embodiment, includes a mobile device comprising a camera and an online auction marketplace platform directly connected to the mobile device over a data network. In further embodiments, the mobile device comprises a processor and memory that stores code executable by the processor to process, on the mobile device, one or more of image and video content of an item captured with the camera of the mobile device such that the one or more of image and video content are processed for posting on the online auction marketplace platform; receive, on the mobile device, information associated with the item in the one or more of image and video content; and send, over the data network, the one or more of image and video content and the information associated with the item directly from the mobile device to the online auction marketplace platform to be posted as an auction listing.

FIG. 1 is a schematic block diagram illustrating one embodiment of a system 100 for generating online auction listings. In one embodiment, the system 100 includes one or more information handling devices 102, one or more auction apparatuses 104, one or more data networks 106, and one or more servers 108. In certain embodiments, even though a specific number of information handling devices 102, auction apparatuses 104, data networks 106, and servers 108 are depicted in FIG. 1, one of skill in the art will recognize, in light of this disclosure, that any number of information handling devices 102, auction apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a 2-in-1 device (e.g., a Microsoft Surface® tablet computer with a selectively attachable keyboard), a smart phone, a barcode scanner, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In one embodiment, the information handling devices 102 are known as mobile devices, handheld devices, or the like if they are embodied as portable computing devices such as smart phones, tablet computers, smart watches, and/or the like. Mobile devices may run operating systems that are specially configured to run on mobile devices such as iOS®, Android®, and/or the like.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include various sensors for data sensing, collecting, monitoring, and/or the like. The sensors may include location sensors (e.g., global positioning system ("GPS") sensors), proximity sensors, wireless signal sensors (e.g., sensors configured to sense wireless signals emitted from other devices such as Bluetooth® signals, Wi-Fi signals, near field communication ("NFC") signals, and/or the like), accelerometers, gyroscopes, light sensors, sound sensors, biometric sensors (e.g., blood pressure sensors, heart-rate monitors, fingerprint sensors, oxygen sensors, and/or the like), and/or the like. The information handling devices 102 may be configured to be coupled to an appliance, module, or the like using a port of the mobile device (e.g., a USB port, a Lightning® connector, a headphone jack, and/or the like) such as a barcode scanner, a camera, a credit/debit card scanner, a fingerprint or other biometric data sensor, and/or the like.

In one embodiment, the auction apparatus 104 is configured to facilitate the creation of an auction listing for an online auction platform using a mobile device. The auction apparatus 104, in one embodiment, captures images/videos of an item using an image capture device (e.g., a camera) of a mobile device and processes the images/videos on the mobile device in preparation to be posted on an online auction marketplace platform.

In further embodiments, the auction apparatus 104 receives information, on the mobile device, associated with the item (e.g., an item description, starting bid price, a reserve price, etc.) and sends the images/videos of the item and the information associated with the item directly (e.g., without using a third-party, intermediary server, device, system, or the like) from the mobile device to the online auction marketplace platform to be posted as an auction listing. The auction apparatus 104, including its various sub-modules, may be located on one or more information handling devices 102 in the system 100, one or more servers 108, one or more network devices, and/or the like. The auction apparatus 104 is described in more detail below with reference to FIGS. 2 and 3.

In one embodiment, the auction apparatus 104 improves upon conventional online auction systems because it provides a seller-focused mobile application that allows a user to capture multiple images/videos of an item from the user's mobile device, process the images/videos on the user's mobile device in preparation for posting as part of an online auction listing, input information about the item, and send the images/videos and the information directly to an online auction marketplace platform from the mobile device without utilizing any third-party or intermediary devices, systems, or the like. In this manner, a user can use their mobile device to capture images of an item and the auction apparatus 104 automatically processes the images/videos, associates the captured images/videos with item information, and transmits the images/videos and information directly to an online auction marketplace platform to be posted as an auction listing. Without the auction apparatus 104, a user would have to upload their images/videos to a computing device, manually sort through the images/videos, manually process the images/videos, and manually upload the images/videos to an online auction website, which is time consuming, tedious, and error prone.

In various embodiments, the auction apparatus 104 may be embodied as a hardware appliance that can be installed or deployed on an information handling device 102, on a server 108, or elsewhere on the data network 106. In certain embodiments, the auction apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the auction apparatus 104 may include a power interface, a wired and/or wireless network interface, a graphical interface that attaches to a display, and/or a semiconductor integrated circuit device as described below, configured to perform the functions described herein with regard to the auction apparatus 104.

The auction apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the auction apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the auction apparatus 104.

The semiconductor integrated circuit device or other hardware appliance of the auction apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the auction apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. For instance, a server 108 may be embodied as an online auction marketplace platform, which, as used herein, is a platform, architecture, infrastructure, or the like for hosting, maintaining, managing, auction listings. Users may browse to the online auction marketplace platform to search for and bid on items that are available for auction.

In one embodiment, the online auction marketplace platform may comprise an online auction marketplace for government surplus items, e.g., items that are purchased by a government entity such as municipalities, schools, etc., and sold at auction to other government agencies or the public at large. The items may include vehicles, electronics, office supplies, and/or other equipment. In such an embodiment, the online auction marketplace platform may enforce various rules or regulations for the online auction listing of a government surplus item such as reallocation rules (e.g., rules defining whether and how the items should be reallocated to other government agencies prior to the general public), buyer qualification rules, pricing rules, and/or the like.

Figure 2:
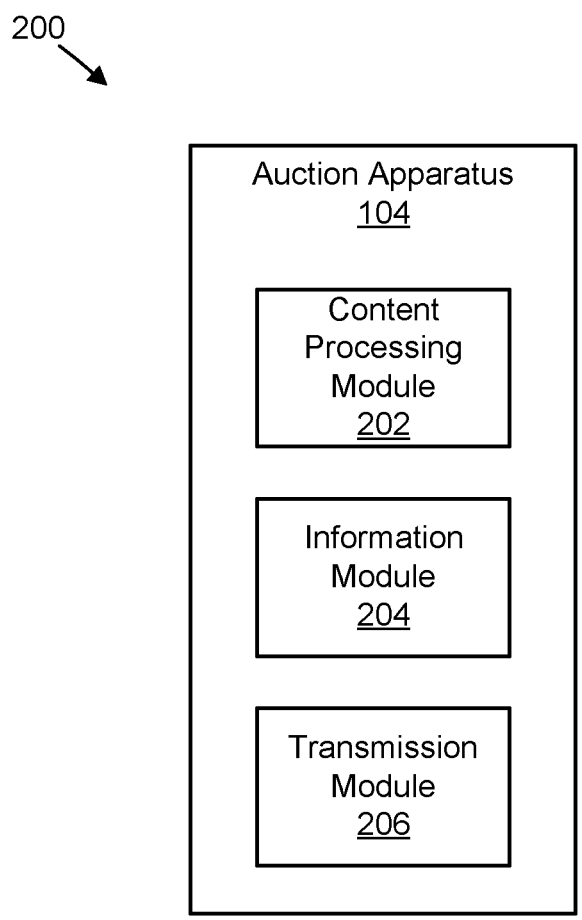
FIG. 2 is a schematic block diagram illustrating one embodiment of an apparatus for generating online auction listings.

FIG. 2 illustrates one embodiment of an apparatus 200 for generating online auction listings. In one embodiment, the apparatus 200 includes an instance of an auction apparatus 104. The auction apparatus 104, in certain embodiments, includes a content processing module 202, an information module 204, and a transmission module 206, which are described in more detail below.

The content processing module 202, in one embodiment, is configured to process, on a mobile device, one or more images or videos of an item captured with a camera of the mobile device. The content processing module 202 may process the one or more images/videos for posting on an online auction marketplace platform. For instance, the content processing module 202 may perform various image processing functions on the images/videos, e.g., adjust one or more of a size, a resolution, a brightness, a contrast, a color, a frame rate, and/or the like of the images/videos. In further embodiments, the content processing module 202 may add or adjust a filter or other image effects for the images. The content processing 202, in certain embodiments, automatically processes the images/videos on the mobile device prior to the images being sent to an online auction marketplace platform for posting as part of an auction listing, which saves time and processing power on the online auction marketplace platform and may not require any input or configuration from the user.

In various embodiments, the content processing module 202 adds a digital watermark to the one or more images/videos of the item. As used herein, a digital mark refers to a kind of marker covertly embedded in content such as video or image data. The watermark may be embedded such that it is visible or invisible to a viewer. A watermark can be used to identify the author of the content, the copyright owner of the content, the source of the content, an authenticity or integrity of the content, and/or the like. The content processing module 202 may add a watermark to the images/videos on the mobile device prior to sending the images/videos to the online auction marketplace platform. In other embodiments, the content processing module 202 may perform various image processing functions on the images/videos for posting on the online auction marketplace platform on the mobile device and then add a watermark to the images/videos at the online auction marketplace platform (or at a different device, e.g., a server with more processing power) prior to the images/videos being posted to the online auction marketplace platform.

In one embodiment, the content processing module 202 sends the processed images/videos to a third-party hosting website instead of, or in addition to, the images/videos being sent to the online auction marketplace platform. The third-party hosting website may include an image hosting website, a video sharing website, a social media platform, and/or the like. In such an embodiment, the information that is associated with the item in the images/videos includes a reference to the images/videos of the item at the third-party hosting website. The reference may include a link (e.g., a hyperlink or URL), an identifier for the images/videos at the third-party hosting website, a file directory or location, and/or the like.

For example, the user may capture a video of the item using their smart phone and instead of uploading the video to the online auction marketplace platform, the content processing module 202 may upload the video to a video sharing site such as YouTube® or Vimeo® (the selected third-party sites may be configurable by the user) and may insert a reference to the video that is inserted in the auction listing for the item at the online auction marketplace platform so that users who view the auction listing can be directed or redirected to the video sharing site using the reference (e.g., clicking on a link to the video).

In one embodiment, the information module 204 is configured to receive, on the same mobile device that was used to capture the images/videos of the item, information associated with the item. For instance, a user may manually enter descriptive information for the item such as the specifications for the item, the condition of the item, a brief history of the item, and/or the like. For example, a user may take images or videos of a vehicle and then provide the VIN of the vehicle, the make and model of the vehicle, the year of the vehicle, the color of the vehicle, the number of miles/kilometers on the vehicle, the general condition of the vehicle, any defects, a maintenance history for the vehicle, and/or the like.

In one embodiment, the information module 204 may locate, detect, identify, or the like a code within an image or video of the item that can be used to query a database for information for the item. The code may include a barcode (e.g., any type of one-dimensional (barcodes that represent data by varying the widths and spacings of parallel lines) or two-dimensional (barcodes that represent data using two-dimensional symbols/shapes) barcodes), a quick response ("QR") code, a universal product code ("UPC"), an International or European Article Number ("EAN"), a stock keeping unit ("SKU") code, a vehicle identification number ("VIN") code, and/or the like. For example, the information module 204 may use image processing functions such as pattern detection, edge detection, optical character recognition, object detection, and/or the like to identify a VIN number, or a barcode representing the VIN number in images and/or videos of a vehicle that is being sold on the online auction marketplace platform.

For instance, the information module 204 may use the identified VIN number to query a vehicle database to lookup the specifications for the particular vehicle, the maintenance history for the vehicle, the accident history of the vehicle, and/or the like. The information module 204, for example, may query a vehicle database maintained by a government agency, the vehicle manufacturer, or another third party organization (e.g., Carfax®) to determine the vehicle's information. The information module 204 may then associate the information with the images and/or videos of the vehicle for the auction listing of the item at the online auction marketplace platform. Other databases for other items may be used such as retail databases, computer databases, electronics databases, and/or other general product and equipment databases.

In certain embodiments, the mobile device may include sensors for reading, sensing, or the like wireless signal codes such as radio-frequency identification ("RFID") tags, Wi-fi signals, Bluetooth® signals, near-field communication ("NFC") signals, and/or the like that may be emitted from the item and can be used to query the database for information about the item.

In some embodiments, the information module 204 receives images or videos as part of the information that is queried from the databases using the scanned or captured code. Continuing with the example above, the information may include stock images of the exterior or interior of the vehicle based on the vehicle's VIN number. A user may elect to use the received images/videos as part of, in addition to, or in place of images/videos that are captured using the mobile device's camera. In certain embodiments, the user may elect to not use any images/videos and may only use the information that is entered or received about the vehicle.

In one embodiment, the transmission module 206 is configured to send the images and/or videos of the item, and the information associated with the item, directly from the user's mobile device to the online auction marketplace platform to be posted as an auction listing on the online auction marketplace platform. The auction listing may include the images/videos of the item that the user captured using the mobile device and the descriptive information associated with the item. The mobile device may have a direct network connection to the online auction marketplace platform, e.g., through a mobile application on the mobile device such that there are no intermediary service providers, servers, networks, and/or other devices that are used to queue, buffer, store, or the like the images/videos and information of the item prior to it being delivered to the online auction marketplace platform.

For example, the mobile device may have a mobile application for the online auction marketplace platform installed that the user uses to capture images/videos of the item that is being sold on the online auction marketplace platform, process the images, gather information about the item, and/or the like. The mobile application may be directly connected to the online auction marketplace platform, e.g., through APIs, web services, and/or the like without going through a different service provider, remote storage service, a server that queues or buffers the images/videos, or the like that is not associated with the online auction marketplace platform.

In one embodiment, the transmission module 206 queues, buffers, and/or the like images/videos, information, etc. for different items that are being sold at the online auction marketplace platform and sends, uploads, or otherwise transmits the images/videos, information, etc. for the different items in a batch upload to the online auction marketplace platform. In such an embodiment, the images/videos and information for the items are used to create different auction listings that are posted on the online auction marketplace platform.

In certain embodiments, the content module 202 receives a plurality of content from different sources, e.g., online sources such as image hosting websites, video sharing sites, social media platforms, and/or other remote storage locations; local storage such as a hard drive, a solid state drive, an expandable storage location (e.g., a secure digital ("SD") card), and/or the like; and/or the like that are accessible to the mobile device and processes the images/videos for posting on the online auction marketplace platform.

In some embodiments, a single user such as an auction agent, a seller's agent, an auction technician, or the like may capture and/or receive content on the mobile device, e.g., images/videos/information about the items from third-party sellers or at the third-party sellers' locations, and send the images/videos/information to the online auction marketplace platform to be posted as an auction listing on behalf of the third-party sellers, either individually or in a batch upload.

Figure 3:
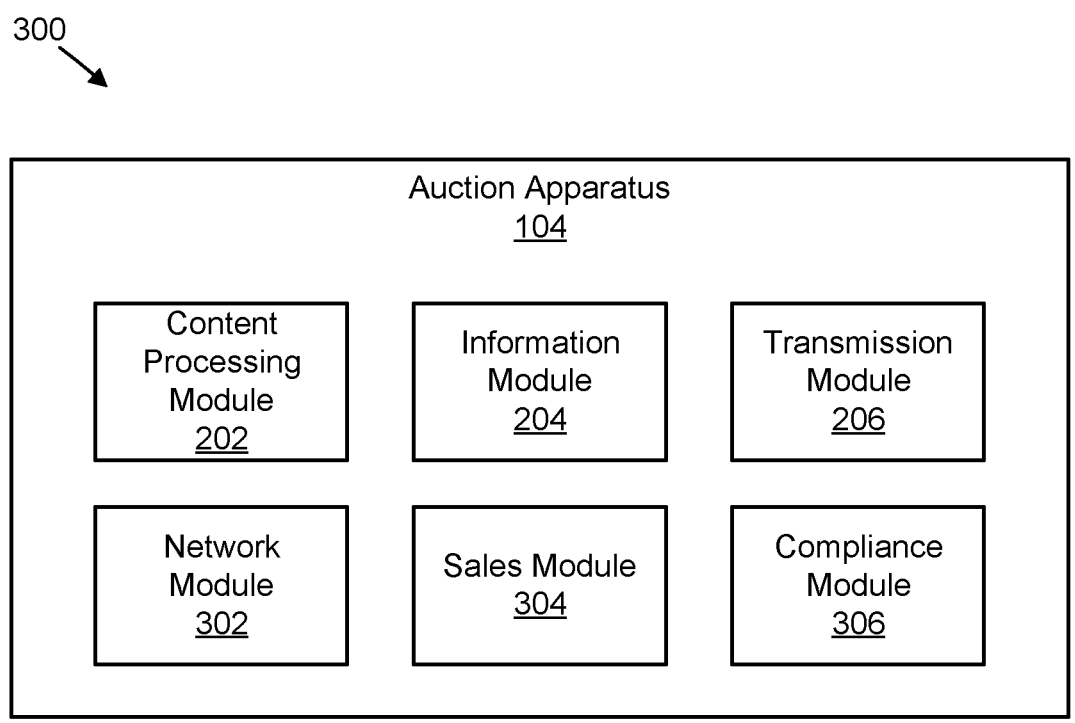
FIG. 3 is a schematic block diagram illustrating one embodiment of another apparatus for generating online auction listings.

FIG. 3 illustrates one embodiment of an apparatus 300 for generating online auction listings. In one embodiment, the apparatus 300 includes an instance of an auction apparatus 104. The auction apparatus 104, in certain embodiments, includes a content processing module 202, an information module 204, and a transmission module 206, which may be substantially similar to the content processing module 202, the information module 204, and the transmission module 206 described above with reference to FIG. 2. In further embodiments, the auction apparatus 104 includes one or more of a network module 302, a sales module 304, and a compliance module 306, which are described in more detail below.

In one embodiment, the network module 302 is configured to detect that the mobile device is unable to connect to the online auction marketplace platform over a data network 106. For example, the mobile device may be at a location that does not have a wireless connection to the data network 106 and/or the online auction marketplace platform may be down or otherwise unavailable.

Accordingly, in one embodiment, in response to detecting that the mobile device cannot connect to the online auction marketplace platform because the online auction marketplace platform is down, the network module 302 sends images/videos and the information associated with the item to a remote third-party storage device for storage. For example, the images/videos and the information for the item may be sent to a cloud storage device or account, e.g., Dropbox®. In further embodiments, when a connection between the remote third-party storage device and the online auction marketplace platform is established, the images/videos and the information associated with the item are sent from the remote third-party storage device to the online auction marketplace platform.

In further embodiments, in response to detecting that the mobile device cannot connect to the online auction marketplace platform because the mobile device is not connected to a data network 106, the network module 302 stores images/videos and the information associated with the item to a secondary storage device for the mobile device, e.g., a storage expansion device such as an SD card. When the mobile device is connected again to the data network 106, the transmission module 206 sends the images/videos and information for the item from the secondary storage device to the online auction marketplace platform.

In one embodiment, the sales module 304 is configured to process payment for the item that is sold using the online auction marketplace platform using the mobile device at the pickup location for the item. For instance, a mobile application (e.g., the same mobile application that is used to capture images/videos of the item and enter information for the item) may be used to process credit or debit card payments (e.g., using a mobile payment card swiping device such as Square®), government payments, mobile payments provided by mobile payment services such as Venmo®, ACH payments, Bitcoin® payments, and/or the like.

In one embodiment, the sales module 304 is configured to collect identifying information of the buyer, or other persons that are present during pickup of the item. For example, the sales module 304 may receive images of the persons that are present during the transaction using the camera on the mobile device, may receive an image of the persons' driver's licenses or other identification information, may receive the persons' biometric information (e.g., a fingerprint, voice recording, etc.), and/or the like. The identification information may be stored or associated with the auction listing for the item in a history, log, archive, or the like so that the auction listing and the identifying information of the buyer can be retrieved at a later time.

In one embodiment, the sales module 304 electronically presents various digital documents for the buyer to sign to complete the auction transaction and pickup the item. The documents may include digital versions of bills of sale, contracts, agreements, licenses, releases, waivers, warranties, legal instruments, and/or the like. The buyer may electronically sign the digital documents using an electronic signature, a stylus or finger on a touch screen, a biometric signature, and/or the like.

In certain embodiments, the sales module 304 generates, creates, submits, sets, triggers, signals, or the like a flag that indicates that the item has been picked up, that the transaction is complete, and/or the like. The flag may be set on the mobile device and/or at the online auction marketplace platform to notify registered processes, applications, services, event handlers, and/or the like that the item has been picked up and the sale is complete so that certain actions can occur such as removing the listing from the online auction marketplace platform, updating inventory values, sending notifications to bidders/sellers/buyers, and/or the like.

In embodiments where the online auction marketplace platform comprises a government surplus auction marketplace, the compliance module 306 is configured to verify that the auction listing for the item, which includes the images/videos and information from the item received from the mobile device, complies with various auction rules that are defined for the government surplus auctions. The rules, for example, may include reallocation rules (e.g., internal reallocation within an organization prior to offering the item for sale outside the organization or to the public), buyer qualification rules (e.g., income rules, whether the buyer has to be a government employee or otherwise authorized to purchase the item), pricing rules (e.g., the price that is set for the item for the auction), and/or the like. Accordingly, if the compliance module 306 determines that the auction listing does not comply with the government surplus auction rules, the compliance module 306 may notify the seller and/or the online auction marketplace platform, take the auction listing down, make the auction listing inaccessible to a buyer, flag the auction listing as being noncompliant, and/or the like.

Figure 4:
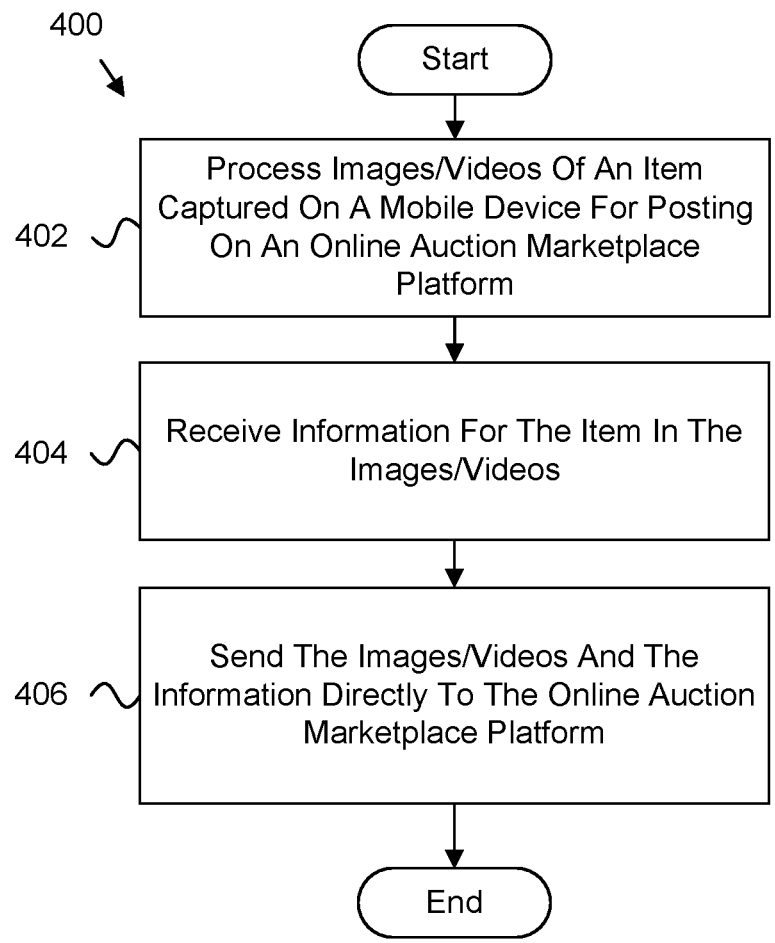
FIG. 4 is a schematic flow chart diagram illustrating one embodiment of a method for generating online auction listings.

FIG. 4 depicts a schematic flow-chart diagram illustrating one embodiment of a method 400 for generating online auction listings. In one embodiment, the method 400 begins and processes 402, on a mobile device, one or more of image and video content of an item captured with a camera of the mobile device. The one or more of image and video content processed for posting on an online auction marketplace platform.

In further embodiments, the method 400 receives 404, on the mobile device, information associated with the item in the one or more of image and video content. In certain embodiments, the method 400 sends 406 the one or more of image and video content and the information associated with the item directly from the mobile device to the online auction marketplace platform to be posted as an auction listing, and the method 400 ends.

In one embodiment, the content processing module 202, the information module 204, and the transmission module 206 perform the various steps of the method 400.

Figure 5:
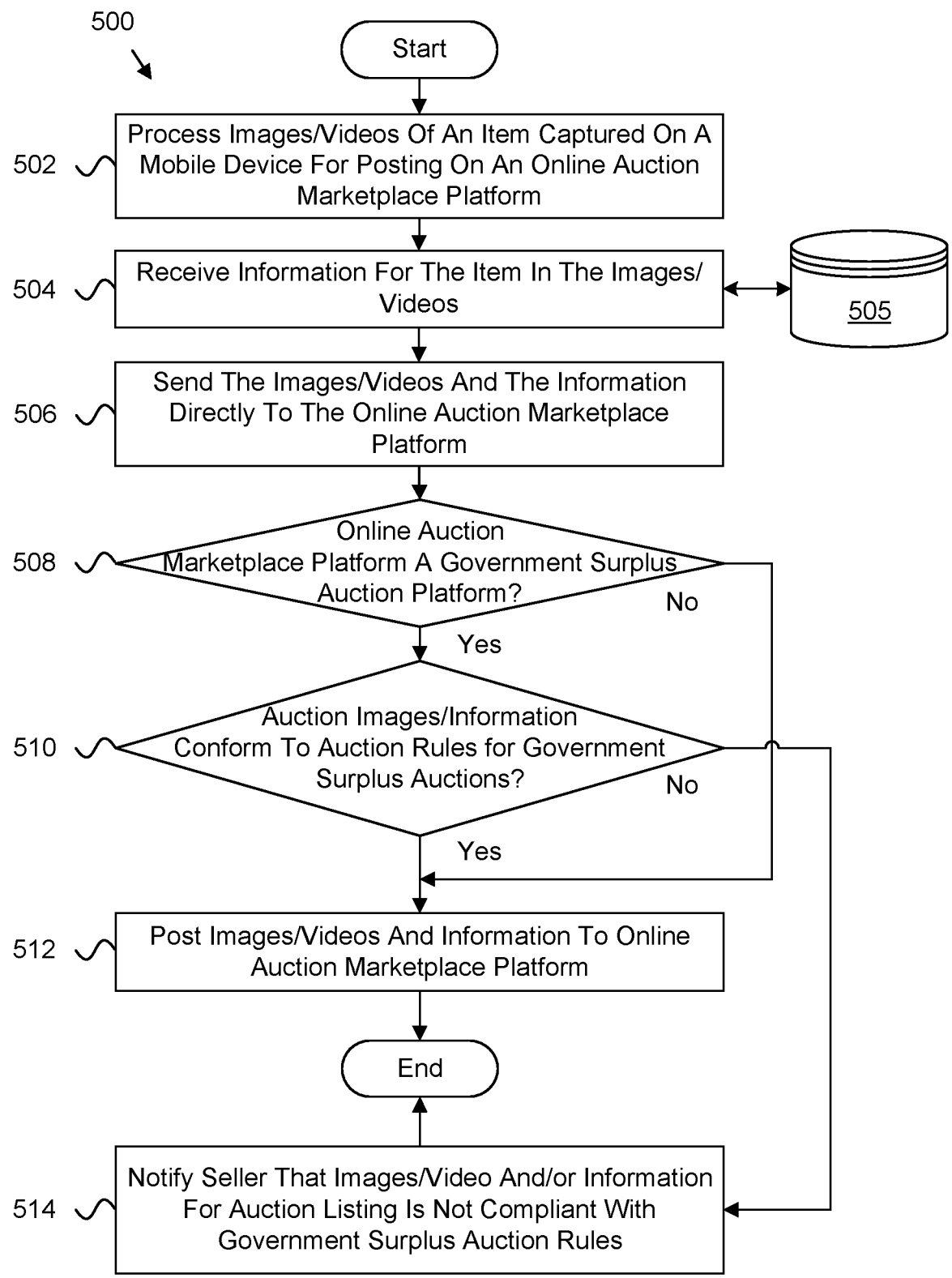
FIG. 5 is a schematic flow chart diagram illustrating one embodiment of another method for generating online auction listings.

FIG. 5 depicts a schematic flow-chart diagram illustrating one embodiment of a method 500 for generating online auction listings. In one embodiment, the method 500 begins and processes 502, on a mobile device, one or more of image and video content of an item captured with a camera of the mobile device. The one or more of image and video content processed for posting on an online auction marketplace platform.

In further embodiment, the method 500 receives 504, on the mobile device, information associated with the item in the one or more of image and video content. In one embodiment, the method 500 may use information in the images/videos, such as barcode information, VIN information, SKU information, or the like to reference a database 505, such as a product database or automobile database, to receive information associated with the item. In certain embodiments, the method 500 sends 506 the one or more of image and video content and the information associated with the item directly from the mobile device to the online auction marketplace platform to be posted as an auction listing.

In further embodiments, if the method 500 determines 500 that the online auction marketplace platform is a government surplus auction platform, and if the method 500 determines 510 that the auction images/video and information conforms to the auction rules for government surplus auctions, then the method 500 posts 512 the images/videos and information for the auction listing to the online auction marketplace platform, and the method 500 ends.

In certain embodiments, if the method 500 determines 508 that the online auction marketplace platform is not a government surplus auction platform, the method 500 posts 512 the images/videos and information for the auction listing to the online auction marketplace platform, and the method 500 ends. In one embodiment, if the method 500 determines 510 that the auction images/videos and/or information does not comply with the auction rules for government surplus auctions for a government surplus auction platform, the method 500 notifies 514 the seller that the images/video and/or information for the auction listing is not compliant with the auction rules for government surplus auctions, and the method 500 ends.

In one embodiment, the content processing module 202, the information module 204, the transmission module 206, and the compliance module 306 perform the various steps of the method 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
 a content processing module that processes, on a mobile device, one or more of image and video content of an item captured with a camera of the mobile device by one of directly and indirectly interfacing with the camera and content editing capabilities of the mobile device to edit one or more visual characteristics of the captured one or more of image and video content for an online auction marketplace platform where the one or more of image and video content is being posted, the one or more of image and video content processed for posting, without user intervention, according to the online auction marketplace platform;
 an information module that receives, on the mobile device, information associated with the item in the one or more of image and video content; and
 a transmission module that sends, over a data network, the one or more of image and video content and the information associated with the item directly from the mobile device to the online auction marketplace platform via one or more of an application programming interface ("API") and a web service of the online auction marketplace platform to be posted as an auction listing; and
 a network module that:
 detects that the mobile device is unable to connect to the online marketplace platform over the data network; and
 one or more of:
  sends the one or more of image and video content and the information associated with the item to a remote third-party storage device for storage, the one or more of image and video content and the information associated with the item sent from the remote third-party storage device to the online auction marketplace platform in response to a connection between the remote third-party storage device and the online auction marketplace platform being established; and
  stores the one or more of image and video content and the information associated with the item on a local storage device of the mobile device,
 wherein said modules comprise one or more of hardware circuits, programmable hardware devices, and a processor executing code.

2. The apparatus of claim 1, wherein the content processing module processes the one or more of image and video content on the mobile device by adjusting one or more characteristics of the one or more of image and video content, the one or more characteristics comprising a size, a brightness, a contrast, a resolution, a color, and a filter effect.

3. The apparatus of claim 1, wherein the content processing module processes the one or more of image and video content on the mobile device by adding a watermark to the one or more of image and video content.

4. The apparatus of claim 1, wherein the content processing module sends the one or more of processed image and video content to a third-party hosting web site and the information module includes a reference to the one or more of processed image and video content at the third-party hosting website as part of the information associated with the item.

5. The apparatus of claim 1, wherein the transmission module sends one or more of image and video content and information associated with the item to the online auction marketplace platform for a plurality of different items in a batch upload.

6. The apparatus of claim 1, wherein the information module receives the information associated with the item by:
 identifying one or more codes within at least one of an image and a video of the item; and
 using the one or more codes to query a database associated with the one or more codes for the information.

7. The apparatus of claim 6, wherein the one or more codes is selected from the group comprising a barcode, a quick response ("QR") code, a universal product code ("UPC"), a European Article Number ("EAN"), a stock keeping unit ("SKU") code, and a vehicle identification number ("VIN") code.

8. The apparatus of claim 6, wherein the database is selected from the group comprising a vehicle database and a product database.

9. The apparatus of claim 1, further comprising a sales module that processes payment for the item using the mobile device at a pickup location for the item, wherein one or more characteristics of the sale are adjustable prior to completing the sale.

10. The apparatus of claim 9, wherein the sales module collects identifying information of a buyer of the item during pickup of the item.

11. The apparatus of claim 9, wherein the sales module presents one or more documents for a buyer to electronically sign for completing the sale.

12. The apparatus of claim 9, wherein the sales module sets a flag to indicate that the item has been picked-up and the sale is complete.

13. The apparatus of claim 1, wherein the online auction marketplace platform comprises a government surplus auction marketplace.

14. The apparatus of claim 13, further comprising a compliance module that verifies that the auction listing associated with the one or more of image and video content and the information associated with the item complies with one or more auction rules defined for government surplus auctions.

15. The apparatus of claim 14, wherein the auction rules defined for government surplus auctions comprise reallocation rules, buyer qualification rules, and pricing rules.

16. A method, comprising:
 processing, on a mobile device, one or more of image and video content of an item captured with a camera of the mobile device by one of directly and indirectly interfacing with the camera and content editing capabilities of the mobile device to edit one or more visual characteristics of the captured one or more of image and video content for an online auction marketplace platform where the one or more of image and video content is being posted, the one or more of image and video content processed for posting, without user intervention, according to the online auction marketplace platform;

receiving, on the mobile device, information associated with the item in the one or more of image and video content;

sending, over a data network, the one or more of image and video content and the information associated with the item directly from the mobile device to the online auction marketplace platform via one or more of an application programming interface ("API") and a web service of the online auction marketplace platform to be posted as an auction listing;

detecting that the mobile device is unable to connect to the online auction marketplace platform over the data network; and one or more of:
sending the one or more of image and video content and the information associated with the item to a remote third-party storage device for storage, the one or more of image and video content and the information associated with the item sent from the remote third-party storage device to the online auction marketplace platform in response to a connection between the remote third-party storage device and the online auction marketplace platform being established; and
storing the one or more of image and video content and the information associated with the item on a local storage device of the mobile device.

17. The method of claim 16, further comprising sending one or more of image and video content and information associated with the item to the online auction marketplace platform for a plurality of different items in a batch upload.

18. A system, comprising:
a mobile device comprising a camera;
an online auction marketplace platform directly connected to the mobile device over a data network,
wherein the mobile device comprises a processor and memory that stores code executable by the processor to:
process, on the mobile device, one or more of image and video content of an item captured with a camera of the mobile device by one of directly and indirectly interfacing with the camera and content editing capabilities of the mobile device to edit one or more visual characteristics of the captured one or more of image and video content for an online auction marketplace platform where the one or more of image and video content is being posted, the one or more of image and video content processed for posting, without user intervention, according to the online auction marketplace platform;

receive, on the mobile device, information associated with the item in the one or more of image and video content;

send, over the data network, the one or more of image and video content and the information associated with the item directly from the mobile device to the online auction marketplace platform via one or more of an application programming interface ("API") and a web service of the online auction marketplace platform to be posted as an auction listing;

detect, on the mobile device, that the mobile device is unable to connect to the online marketplace platform over the data network; and one or more of:
send the one or more of image and video content and the information associated with the item to a remote third-party storage device for storage, the one or more of image and video content and the information associated with the item sent from the remote third-party storage device to the online auction marketplace platform in response to a connection between the remote third-party storage device and the online auction marketplace platform being established; and
store the one or more of image and video content and the information associated with the item on a local storage device of the mobile device.

19. The apparatus of claim 14, wherein, in response to the compliance module determining that an auction listing is noncompliant, the compliance module at least one of notifies the seller, notifies the online auction marketplace platform, makes the auction listing inaccessible to a buyer, and flags the auction listing as noncompliant.

20. The method of claim 12, wherein, in response to the flag being set to indicate that the item has been picked-up and the sale is complete, the sales module is further configured to at least one of remove the listing from the online auction marketplace platform, update inventory, and send notifications to interested parties.

\* \* \* \* \*